INVENTOR.
HARRY L. WOROSZ.
BY Wallace P. Lamb
ATTORNEY.

INVENTOR.
HARRY L. WOROSZ.
BY
Wallace P. Lamb
ATTORNEY.

March 14, 1967 H. L. WOROSZ 3,309,683
AIR BEARING TRANSDUCER APPARATUS
Filed Dec. 7, 1962 5 Sheets-Sheet 3

INVENTOR.
HARRY L. WOROSZ.
BY
*Wallace P. Sand*
ATTORNEY.

March 14, 1967 — H. L. WOROSZ — 3,309,683
AIR BEARING TRANSDUCER APPARATUS
Filed Dec. 7, 1962 — 5 Sheets-Sheet 4

INVENTOR.
HARRY L. WOROSZ
BY
Wallace P. Lund
ATTORNEY.

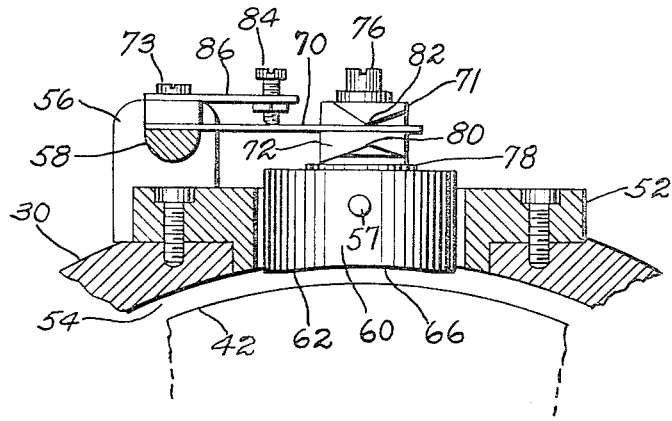
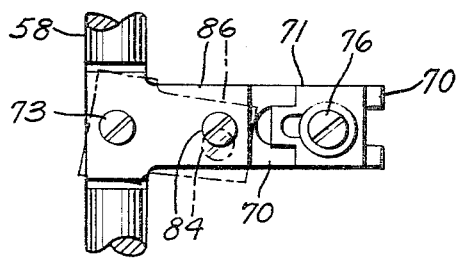
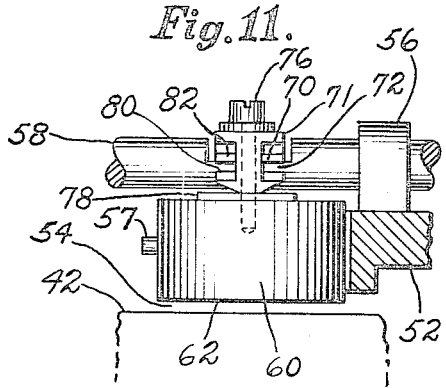
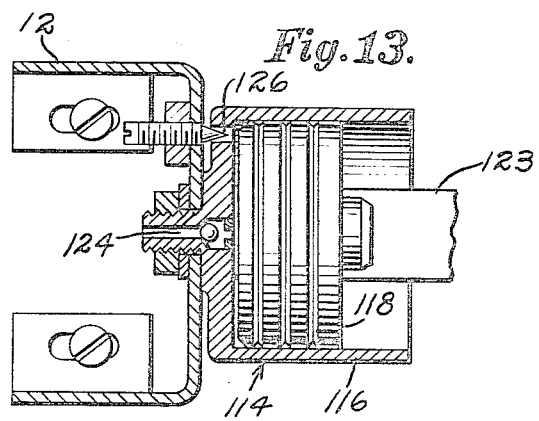
INVENTOR.
HARRY L. WOROSZ.

United States Patent Office 3,309,683
Patented Mar. 14, 1967

3,309,683
AIR BEARING TRANSDUCER APPARATUS
Harry L. Worosz, Dearborn, Mich., assignor to Burroughs Corporation, Detroit, Mich., a corporation of Michigan
Filed Dec. 7, 1962, Ser. No. 243,107
9 Claims. (Cl. 340—174.1)

This invention relates generally to information storage apparatus having a rotating magnetizable storage surface and particularly to mechanism for positioning magnetic transducers relative to the magnetizable surface.

It is an object of the present invention to provide an improved mechanism for moving a magnetic transducer from a normally retracted ineffective position to an effective position proximate a magnetizable surface of a rotatable member.

Another object of the invention is to provide an improved transducer positioning mechanism that will move the transducer to its effective position proximate a magnetizable information storage surface without danger of physical contact therewith.

Another object of the invention is to provide for moving a transducer carrier to a predetermined position to place the transducer in a corresponding position proximate the magnetizable surface and hold said carrier against return movement by increased air pressure generated at and by rotative action of the magnetizable surface.

In connection with the next preceding object, it is a further object to provide for movement of the transducer toward and away from the magnetizable surface in response to small variations in pressure of the air cushion and to accomplish this without transmitting such movement to the transducer carrier.

Other objects of the invention will become apparent from the following description, taken in connection with the accompanying drawings in which:

FIG. 10 is an enlarged fragmentary sectional view taken along the line 10—10 of FIG. 9;

FIG. 11 is an end view looking in the direction of the arrows 11—11 of FIG. 10;

FIG. 12 is a plan view, and

FIG. 13 is an enlarged sectional view of a dash-pot unit of the apparatus, shown removed therefrom.

Figure 1:
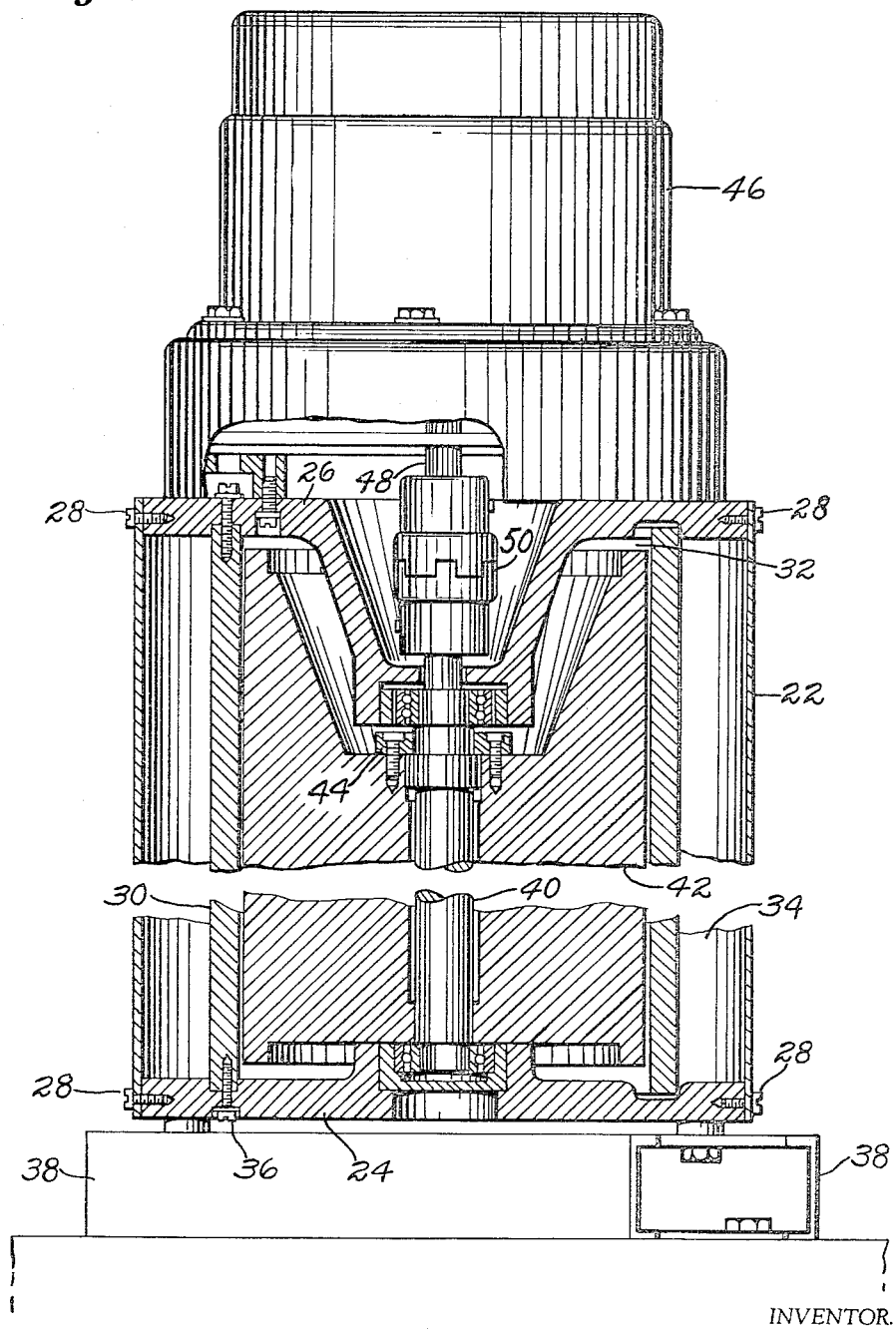
FIG. 1 is a vertical sectional view of an information storage apparatus embodying features of the invention.
Figure 2:
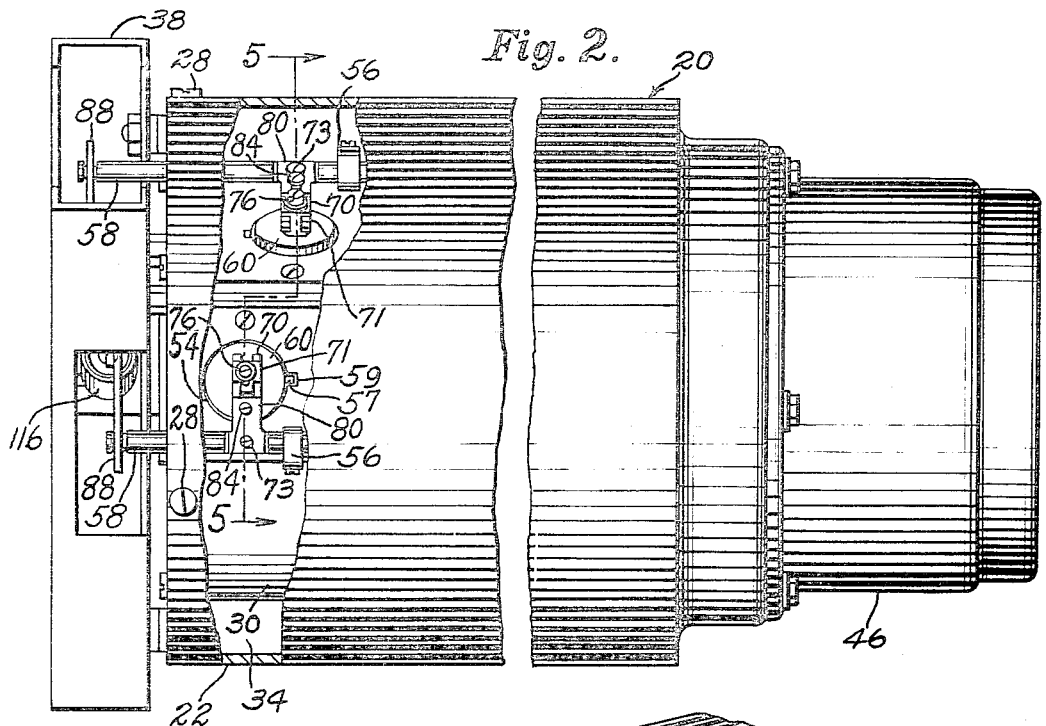
FIG. 2 is a fragmentary side view partly broken away and in section.

Referring to the drawings by characters of reference, the information storage apparatus shown includes a supporting means or housing 20 preferably of cylindrical shape comprising a sleeve 22, a lower end wall 24 and an upper end wall 26. The sleeve 22 and end walls 24 and 26 may be secured together, such as by means of screws 28. Within and concentric with sleeve 22 there is a cylindrical separator or sleeve 30 which divides the interior of the housing into an inner drum compartment 32 and an outer mechanism compartment 34. As shown, the opposite ends of the inner sleeve 30 abut respectively the upper end wall 24 and lower end wall 26 and may be secured thereto, such as by screws 36. Welded, or otherwise secured to the lower end wall 24 is a pair of channel members 38 providing a mounting base for the apparatus.

With particular reference to FIG. 1, a driven shaft 40 within and coaxial of the inner sleeve is journalled on the housing end walls 24 and 26 and affixed on and rotatable with the shaft is a memory drum 42. In the present construction, the drum 42 is affixed to the driven shaft 40 by a collar 44 which is press fitted onto the shaft and secured by screws to the recessed end wall of the drum. The drum 42 occupies substantially the entire drum compartment 32, the periphery being proximate the inner surface of the sleeve 30, as shown. The outer cylindrical periphery of the drum 42 is coated with a thin film of magnetizable material, such as a ferromagnetic coating of nickel, and/or a coating of a cobalt-nickel compound, or any other suitably magnetizable material of high coercivity and high density binary recording applications.

The drum 42 is rotated by an electric motor 46 which is mounted on the housing top wall 26. A downwardly directed motor drive shaft 48 is directly connected to the upper end of the drum shaft 40 by a suitable coupling 50.

Figure 5:
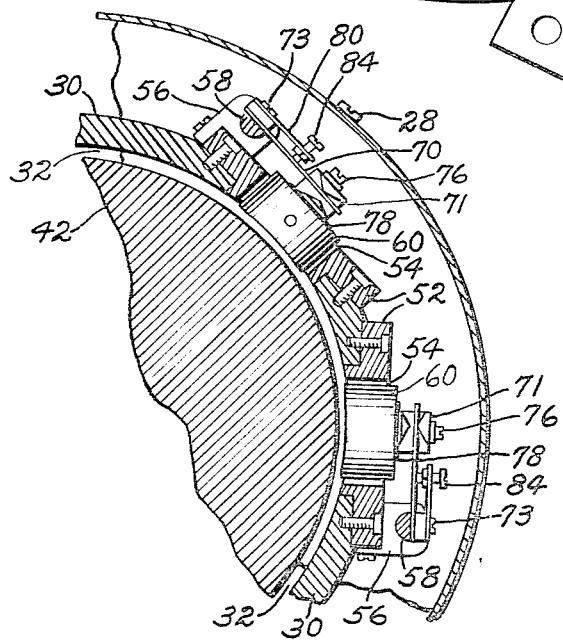
FIG. 5 is a fragmentary cross sectional view taken along the line 5—5 of FIG. 2 and showing the operating parts in their ineffective positions.
Figure 6:
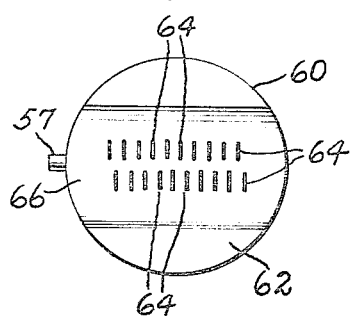
FIG. 6 is an end view of a transducer unit of the apparatus, shown removed therefrom.

In the side of the inner sleeve 30 there is a pair of openings that are elongated axially of the sleeve, and respectively positioned in these openings there is a pair of elongated mounting members or plates 52 which are secured to the sleeve by screws. Each of the mounting plates 52 is provided with a plurality of apertures 54, spaced apart longitudinally thereof and arranged such that the apertures in one of the plates are in staggered relation, axially of the drum 42, to the apertures in the other of the plates 52. Mounted on each of the plates 52 along one of the side edges of each there is a row of spaced apart bosses 56, the row of bosses 56 of each of the plates 52 having aligning apertures to receive a rotatable rod 58. Mounted on and in spaced relation along each of the rods 58 to rotate therewith is a plurality of mounting heads 60 each of which may contain a plurality of magnetic read-write transducers. The transducers are not shown as they form no part of the present invention. The heads 60 respectively position in the apertures 54 in plates 52, the walls of the apertures to function as retainers for limiting lateral movement of the heads. Fixed in and to the side of each of the heads 66 there is a pin 57 which projects into a slot 59 in plates 52 to prevent appreciable rotation of the heads. For a complete description of read-write transducers, reference may be had to the patent to Donald T. Best et al., entitled, "Control for Retractible Transducers," No. 3,005,676, issued Oct. 24, 1961, and the patent to Otto Hohmecker, entitled, "Magnetic Head Suspension," No. 2,950,354, issued Aug. 23, 1960. In general, each of the heads 60 of the present transducer assembly comprises a cylindrical cup having an end wall 62 and within the cup the transducers are arranged to two rows and encapsulated by a suitable potting compound. In the end wall 62 of the cup, as shown in FIG. 5, there is provided a plurality of slot-like apertures 64 and the transducer core poles are positioned respectively in registry with the slots 64 which face toward the magnetizable surface of the memory drum 20.

The slotted faces of the transducer heads 60 are each provided with a concave area 66 to obtain a planing surface so that the heads will move toward and away from the drum surface in response to changes in pressure of an air cushion which is created about and by the rotative action of the drum periphery. The purpose of planing the heads 60 on the air cushion is, of course, to maintain the distance between faces 66 and the drum periphery at a predetermined substantially constant distance for best read-write results, the air pressure being a variable by reason of minor imperfections in the drum periphery.

The transducer heads 60 are mounted on the rotatable mounting rods 58 respectively by resilient arms 70, corresponding ends of the arms being affixed securely to flattened portions of the rods by screws 73. As shown, the arms 70 extend laterally from the rods 58 and have free ends respectively overlying the transducer heads 60. In order to provide for the floating of the heads 60 on the air cushion at the drum periphery, the heads are mounted on the resilient arms 70 by means of particular mounting members 71 which are loosely supported on the arms 70. The mounting members 71 may be in the form of blocks and each has the opposite ones of a pair of its sides partially recessed to provide a reduced flat sided central portion 72 which is received in a slot 74, provided in arm 70 by bifurcation thereof at the free end of the arm. A screw 76 extends through the reduced portion 72 of block 71 and arm slot 74 and screwthreads into a metal plate 78 embedded in the potting compound of head 60. The hole in the mounting block 71 to receive screw 76 is elongated in the direction of arm 70 to provide for adjusting the head therealong to center the head in its retaining aperture 54.

As is shown more clearly in FIG. 10, the recessing of the mounting block sides 72 is partial, as above mentioned, and the configuration of the recessing is such that on each side of the block is provided tapered bearing members 80, 82 that taper to pressure application apices in spaced opposed relation to each other. The bifurcated free end portion of arm 70 extends between the tapered portions 80, 82 which, as shown in FIG. 10, are spaced apart a greater distance than the thickness of the arm 70 so that the arm 70 bears only against the apex of bearing member 80 when the head 60 is in its effective position proximate the periphery of the drum 42 as shown in FIG. 10. In this position of the head 60, the resilient arm 70 is yieldingly holding the head in a predetermined position proximate the head to balance the opposing air cushion pressure at the effective head position and bearing member 80 functions as a fulcrum for the head. An adjustment member or screw 84 is carried by an arm 86 having one end fixed to rod 58 by the screw 73 and overlying the resilient arm 70. It will be seen that by means of the adjustment screw 84 the tension of the resilient arm 70 may be adjusted to balance the opposing force of the air cushion when the head 60 is at the desired effective position proximate the drum periphery. It may occur, because of manufacturing limits, that one or more of the arms 70 has a slight twist along its length which would, of course, deleteriously effect the position of the head 60 in its aperture 54. To compensate for this, the screw 73 may be released and arm 86 pivoted, as indicated by its dot and dash position of FIG. 12, to a position where the pressure of the adjustment screw 84 on the arm will effect a straightening of the arm to properly position the head 60 in its retaining aperture 60 and therefore in proper position with respect to the drum periphery.

Figure 7:
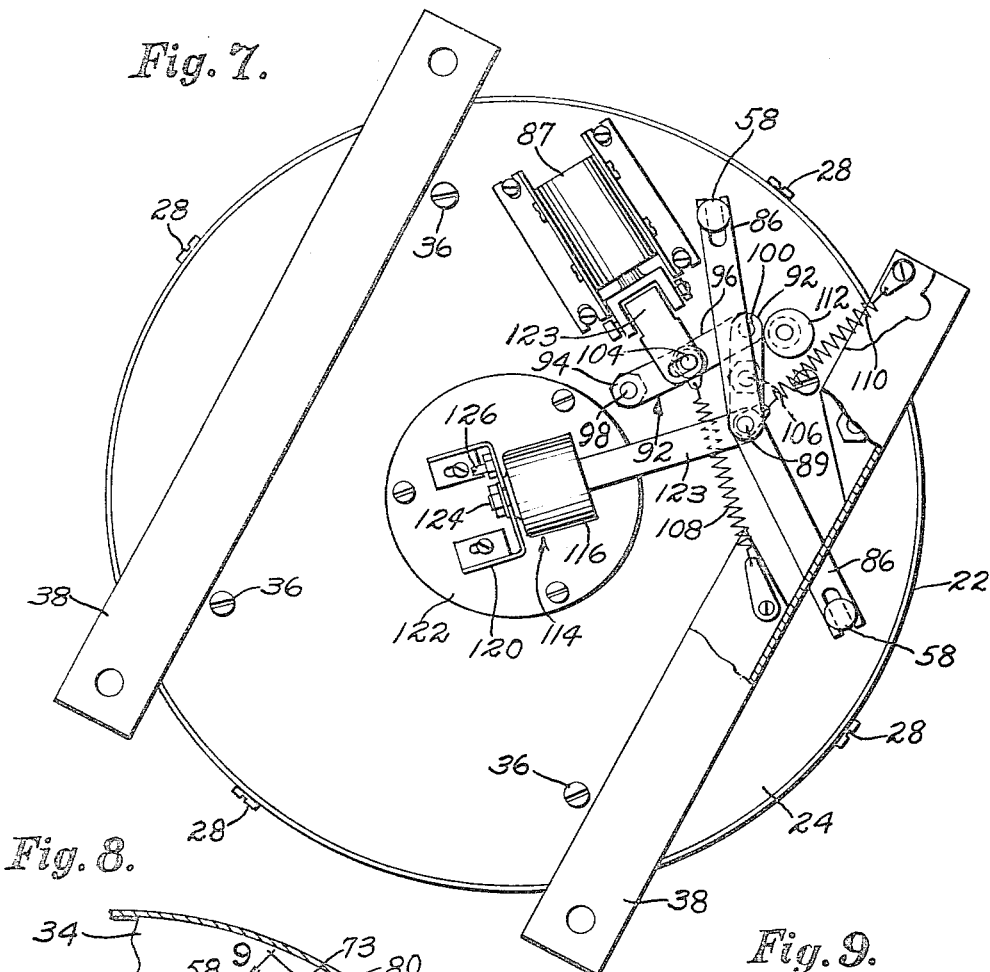
FIG. 7 is a view similar to FIG. 4 showing the operating parts in their effective positions.

A power element or solenoid 87 is provided to rotate the rods 58 in a direction to move the heads 60 from their retracted ineffective positions of FIG. 5 to their effective positions of FIG. 7, proximate the drum periphery. The rotatable rods 58 have corresponding end portions thereof projecting externally of the housing through the bottom wall 24 thereof, and connected respectively to these ends of the rods are the outer ends of a pair of crank arms 88 having their other ends pivotally connected for pivotal movement together by a pin 89.

In accordance with one feature of the invention, I provide a motion transmitting mechanism comprising a toggle device 90 and an operating lever 92 for operatively connecting the pivot pin 89 of cranks 88 to the solenoid 87 and to lock the heads 60 in effective positions against the opposing action of the air cushion which tends to rotate the rods 58 in the opposite direction. To accomplish this, the toggle device 90 and the operating arm 92 are arranged in relation to the rod cranks 58, such that the back pressure of the air cushion is ineffective on the toggle device. The toggle device comprises a pair of levers 94 and 96 of which lever 94 has a fixed fulcrum pin 98, and lever 96 has a movable fulcrum pin 100 pivotally connected thereby to one end of the operating lever 92. As is more clearly seen in FIG. 7, the toggle levers 94 and 96 have their pivots 98 and 100 laterally positioned respectively on opposite sides of the solenoid plunger, as at 102, and have adjacent ends pivoted by a pin 104 to the plunger in an elongated aperture to provide for relative movement between the parts. Intermediate its ends the operating lever 92 is pivoted on a fixed pin 106 which is affixed to the housing end wall 24, and the lever 92 is connected to the crank arms 88 by the connecting pin 89. It will now be seen by reference to FIG. 7, that the torque placed on rods 58 by the air cushion, tends to rotate the operating lever 92 in a counterclockwise direction, but that this force is applied endwise of toggle lever 96 and thus is ineffective to operate the toggle with the result that said force is not effectively opposing the solenoid 84.

Yieldingly opposing the solenoid 87 is a pair of helical coil springs 108 and 110 which function to retract the heads 60 upon de-energization of the solenoid 84. The spring 108 is attached at one end thereof to the pin 104 and at its other end is anchored to the hanger 38. The other spring 110 has one end connected to the pin 89 and the other end connected to the hanger 38. An adjustable stop member 112, such as an eccentrically mounted disc, is affixed to the housing end wall 24 in position for abutment by the operating lever 92 to limit movement of the heads 60 toward the drum periphery. The stop member 112 is set to stop the heads at a position proximate the drum periphery calculated to give the optimum efficiency in read and write operations of the transducers. This distance is so minute, however, that there is danger of overtravel of the heads and destructive collision with the drum, due to the collective tolerances between parts and the inertia of a quick acting solenoid. Accordingly, I delay the action of the solenoid 84 by the provision of a dash-pot designated generally by the numeral 114.

Figure 3:
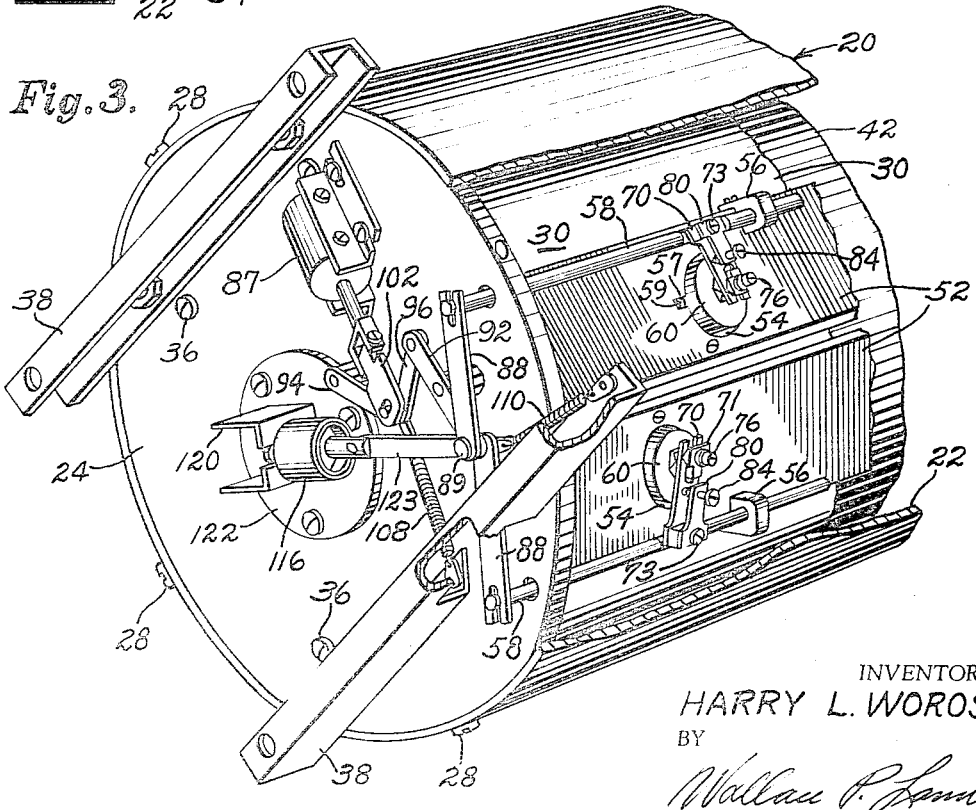
FIG. 3 is a fragmentary perspective view.

The dash-pot 114 comprises in general, a cylinder 116 and a piston 118, the cylinder being mounted by a bracket 120 on a mounting cap 122, FIG. 3, which is secured to the housing bottom wall 24, such as by screws. As shown in FIG. 7, the dash-pot is spaced substantially midway between the ends of rods 58 and the piston has a connecting rod 123 which is connected to the rod crank arms 88 by means of the pivot pin 89. In and centrally of the cylinder end wall is provided a normally open check valve 124 and also in said wall is provided an air restriction or air bleed 126. The air bleed 126 functions to yieldingly oppose movement of the piston 118 to the position shown in FIG. 7, corresponding to the effective positions of the heads 60, and the check valve 124 functions to effect equalization of pressure on opposite ends of the piston to obtain rapid retraction of the heads 60.

Figure 8:
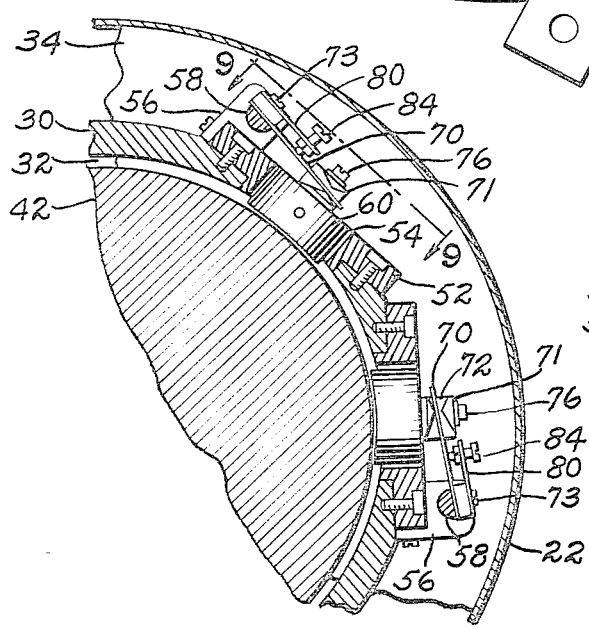
FIG. 8 is a fragmentary cross sectional view similar to FIG. 5, showing the operating parts in their effective positions.
Figure 9:
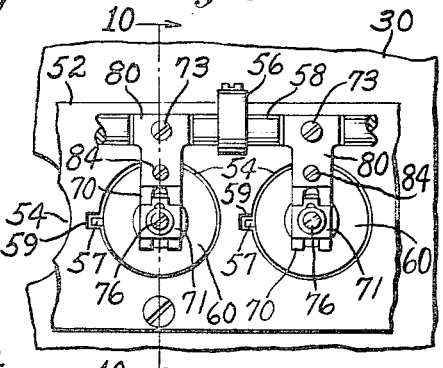
FIG. 9 is an enlarged elevational view, taken in the direction of the arrows 9—9 of FIG. 8.

In operation, assuming the memory drum to be at rest, the motor circuit switch is closed and when the surface speed of the memory drum has reached its predetermined maximum speed, the circuit of the solenoid 87 is closed. Insofar as concerns the present invention, the circuit of the solenoid 87 may be manually closed, or may be under the control of any of the well-known switches that are responsive to a predetermined increase in the motor shaft torque as a function of drum surface speed. In either case, the energization of the solenoid 87 results in the movement of the toggle levers 94, 96, under the opposing action of dash-pot 114, slowly from the positions shown in FIG. 4 to the positions shown in FIG. 7. This operation of the toggle levers 94, 96 pivots the operating lever 92 which in turn pivots the crank arms 88 to rotate the head carrying rods 48 and thus move the heads 60 to their effective positions proximate the periphery of the memory drum 42. The heads are stopped, by engagement of lever 92 with stop member 112, in desired spaced relationship to the drum periphery to achieve optimum read-write functions by the transducers, the dash-pot 114 slowing the solenoid action to avoid any overtravel and collision of the heads 60 with the drum 42. The operating parts are now in the positions shown in FIG. 7 and the transducer carrying heads 60 are in corresponding positions shown in FIG. 8. As previously mentioned, imperfections in the drum periphery due to limitations of production methods and tools will cause variations in the pressure of the surrounding air cushion which would ordinarily cause fluctuations in the read-write performance of the transducers. However, in the present construction, the tensioned resilient supporting arms 70 of the heads 60 respond to changes in pressure of the air cushion, moving the heads toward and away from the drum periphery so as to maintain the distance therebetween substantially constant with accompanying optimum read-write quality performance of the transducers. The back pressure of the air cushion is not transmitted to the solenoid 84 by reason of the toggle 92 for, as previously mentioned, the back pressure of the air cushion tending to rotate the operating lever 92 in a counterclockwise direction, as seen in FIG. 7, is acting endwise against the toggle and thus is ineffective in opposing the solenoid 87.

Figure 4:
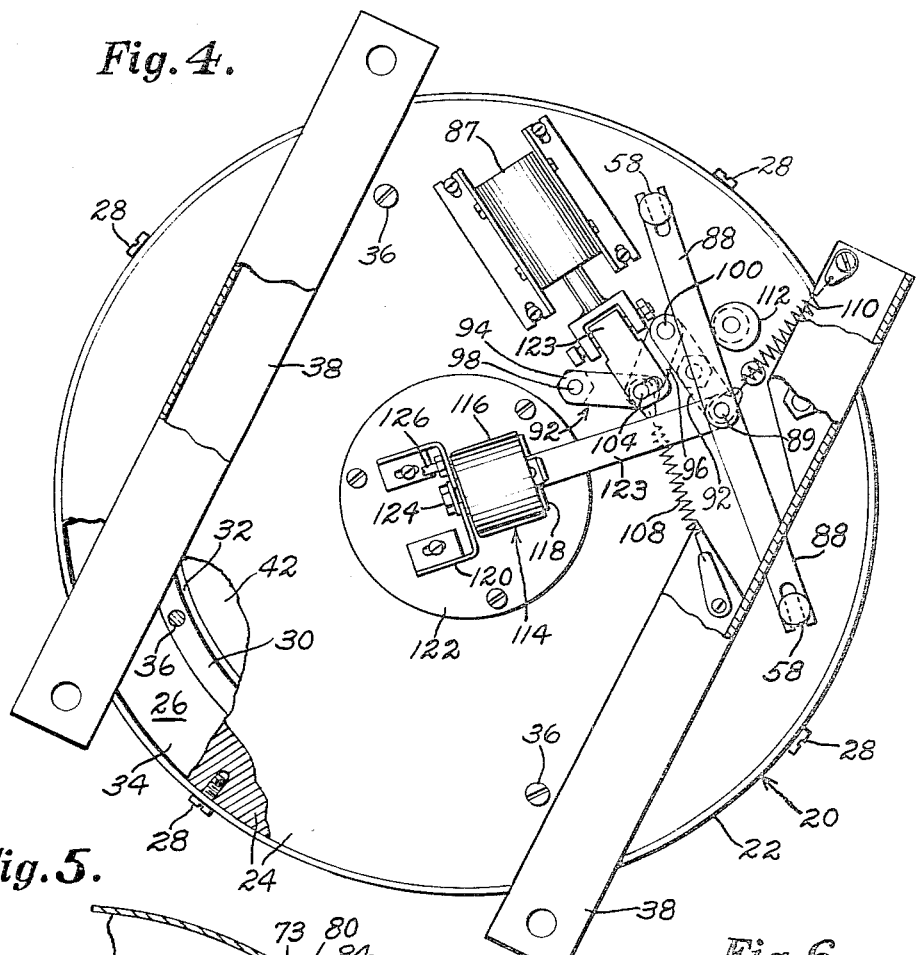
FIG. 4 is a bottom view, showing certain operating parts in their retracted ineffective positions.

When the machine operation is to be stopped, the motor 46 and the solenoid 87 are de-energized whereupon the coil springs 108 and 110 become effective to retract the heads 60 to their ineffective positions shown in FIG. 4. The springs 108 and 110 pivot the levers 94 and 96 to the positions shown in FIGS. 4 and 5 and in so doing pivot the operating lever 92 counterclockwise and through the crank arms 88 rotate the rods 58 in directions to pivot the heads 60 away from the drum 42. When the springs 108 and 110 act to retract the heads 60, as above described, it is necessary for the springs to move the dash-pot piston outwardly which offers little resistance as the check valve 124 opens to equalize the pressure on opposite ends of the piston.

What is claimed is:

1. In an information storage apparatus, a rotatable means having a magnetizable surface for the recording of information and generating an air cushion at said surface by the rotary action of said means, a resilient arm mounted in spaced relation to the magnetic surface of said rotatable means, said arm having a free end portion overlying and tensioned to oppose the pressure of said air cushion, a magnet carrying head having a planing face with a plurality of openings facing said magnetizable surface, said head urged by the tension of said arm to ride on said cushion of air proximate said magnetizable surface, said head movable relative to said arm, and means limiting movement of said head relative to said arm.

2. In an information storage apparatus, a rotatable means having a magnetizable surface for the recording of information and generating an air cushion at said surface by the rotary action of said means, a resilient arm mounted in spaced relation to the magnetic surface of said rotatable means, said arm having a free end portion overlying and tensioned to oppose the pressure of said air cushion, a magnet carrying head having a planing face with a plurality of openings facing said magnetizable surface, said head urged by the tension of said arm to ride on said cushion of air proximate said magnetizable surface, said head movable relative to said arm, means limiting movement of said head relative to said arm, a power element operable to move said arm from a retracted position in a direction to position said head proximate said magnetizable surface, and a toggle lever operatively connecting said arm to said power element and locking said arm against movement toward retracted position.

3. In an information storage apparatus, a rotatable means having a magnetizable surface for the recording of information and generating an air cushion at said surface by the rotary action of said means, a resilient arm mounted in spaced relation to the magnetic surface of said rotatable means, said arm having a free end portion overlying and tensioned to oppose the pressure of said air cushion, a magnet carrying head having a planing face with a plurality of openings facing said magnetizable surface, said head urged by the tension of said arm to ride on said cushion of air proximate said magnetizable surface, said head movable relative to said arm, means limiting movement of said head relative to said arm, a power element operable to move said arm from a retracted position in a direction to position said head proximate said magnetizable surface, a toggle lever operatively connecting said arm to said power element and locking said arm against movement toward retracted position, and a dash-pot operatively connected to said arm and yieldingly opposing said power element.

4. In an information storage apparatus, a rotatable member having a magnetizable surface for recording information, said rotatable member generating by rotation an increase in air pressure adjacent said surface, a magnetic transducer mounted for movement from a normally retracted position to an effective position proximate said surface, said transducer biased to said retracted position, a power element operatively connected to said transducer and operable to move the latter to said effective position, and a dash-pot operatively connected to said power element to decrease the rate of movement of said transducer by said power element to said effective position.

5. In an information storage appartus, a rotatable member having a magnetizable surface for recording information, said rotatable member generating by rotation an increased air pressure adjacent said surface, a magnetic transducer mounted for movement from a normally retracted position to an effective position adjacent said surface, a power element operable to move said transducer to said effective position, an operating lever operatively connected to said transducer, a toggle device operatively connecting said operating arm and said power element and to oppose movement of said transducer away from said surface by said increased air pressure, and a dash-pot yieldingly opposing movement of said transducer to the effective position by said power element.

6. In an information storage apparatus, a rotatable member having a magnetizable surface for recording information, said member by rotation creating an increased air pressure adjacent the magnetizable surface with the air pressure varying in accordance with variations in the contour of the magnetizable surface, a mounting member rotatable relative to said rotatable member, a resilient arm mounted at one end thereof on said mounting member and extending laterally from the axis of rotation of said rotatable member for movement toward and away from said magnetizable surface, a magnetic transducer carried by the free end of said resilient arm, said transducer movable from a retracted ineffective position to an effective position proximate said magnetizable surface upon rotation of said mounting member in a corresponding direction, a power element operable to rotate said mounting member in said direction, a toggle device operatively connecting said rotatable mounting member to said power element and holding said mounting member against the back pressure of said air pressure, and a dash-pot yieldingly opposing said power element to control the said magnetizable surface.

7. In an information storage apparatus, a rotatable drum having its outer cylindrical surface magnetizable for recording information, said drum by its rotative action generating an increased air pressure cushion about the magnetizable surface with the air pressure varying in accordance with variations in the contour of the surface, a rotatable rod having its axis of rotation parallel with the axis of said drum in spaced relation to and outwardly of said surface, a plurality of resilient arms in spaced relation on said rod for rotation therewith and having free ends overlying the magnetizable surface, a plurality of transducer carrying heads respectively mounted on the free ends of said resilient arms, said heads being rotatable with said rod from ineffective retracted positions to effective positions proximate said magnetizable surface for support on said air cushion, said resilient arms flexing in response to changes in pressure of the air cushion to maintain the individual distances between said heads and said magnetizable surfaces substantially constant, a power element operable to rotate said rod in a direction to move said heads to effective positions, a toggle lever operatively connecting said rod to said power element and movable by said power element to a position opposing rotation of said rod in the opposite direction by back pressure of said air cushion, and a dash-pot yieldingly opposing rotation of said rod by said power element.

8. In an information storage apparatus, a cylindrical housing, a sleeve within said housing coaxially thereof and dividing said housing into an inner compartment and an outer compartment, said sleeve having an aperture radially through the side wall thereof, a memory drum rotatably mounted within said inner compartment and having its cylindrical outer surface magnetizable, the rotary action of said drum generating an air cushion around the magnetizable drum surface, a magnet carrying head received in the aperture in said sleeve, said head having a planing face with openings therethrough facing the outer surface of said drum, a rotatable rod in said outer compartment parallel to the axis of said drum and mounted on said sleeve, a resilient arm affixed at one end thereof to and laterally of said shaft, said arm having a free end overlying and loosely connected to said head within said outer compartment and tensioned to hold said head proximate said magnetizable surface against the opposing air cushion pressure on the head planing surface.

9. In an information storage apparatus, supporting means, a leaf spring mounted adjacent one end thereof on said supporting means, a mounting member loosely received on said leaf spring, a transducer head carried by said mounting member, an arm mounted on said supporting means and overlying said leaf spring, an adjustment member carried by said arm and operable to vary the tension of said leaf spring, said arm movable to change the point of application of said adjustment member on said arm.

References Cited by the Examiner
UNITED STATES PATENTS 2,961,494    11/1960    Darou et al.    340—174.1
3,202,974    8/1965    Baillif    340—174.1

BERNARD KONICK, *Primary Examiner.*

A. I. NEUSTADT, *Assistant Examiner.*